US009015384B2

(12) United States Patent
Warren et al.

(10) Patent No.: US 9,015,384 B2
(45) Date of Patent: Apr. 21, 2015

(54) METHODS AND APPARATUS FOR TRANSPORTING DATA THROUGH NETWORK TUNNELS

(75) Inventors: Niel D. Warren, Soquel, CA (US); Girault W. Jones, Jr., Cupertino, CA (US); Raymond B. Montagne, Cascade, ID (US); Matthew X. Mora, Fremont, CA (US); Brett D. George, Mountain View, CA (US); Michael W. Murphy, Menlo Park, CA (US); William P. Cornelius, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/462,603

(22) Filed: May 2, 2012

(65) Prior Publication Data

US 2012/0284434 A1  Nov. 8, 2012

Related U.S. Application Data

(60) Provisional application No. 61/481,641, filed on May 2, 2011.

(51) Int. Cl.
| | |
|---|---|
| *G06F 15/16* | (2006.01) |
| *G06F 13/28* | (2006.01) |
| *H04L 12/851* | (2013.01) |
| *H04J 3/06* | (2006.01) |
| *G06F 13/00* | (2006.01) |
| *H04L 12/859* | (2013.01) |

(52) U.S. Cl.
CPC ......... *H04L 47/2441* (2013.01); *H04L 47/2475* (2013.01); *H04J 3/0638* (2013.01); *G06F 13/00* (2013.01); *H04J 3/0635* (2013.01)

(58) Field of Classification Search
None
See application file for complete search history.

(56) References Cited

U.S. PATENT DOCUMENTS

| | | | |
|---|---|---|---|
| 5,710,773 A | 1/1998 | Shiga et al. | |
| 6,631,432 B1 | 10/2003 | Yamagishi et al. | |
| 7,779,187 B2 * | 8/2010 | Ikeda et al. | 710/111 |
| 7,859,998 B2 * | 12/2010 | Wade et al. | 370/230 |

(Continued)

FOREIGN PATENT DOCUMENTS

| | | |
|---|---|---|
| EP | 2222112 A1 | 8/2010 |
| KR | 10-2004-0104242 | 12/2004 |

OTHER PUBLICATIONS

"3rd Generation Partnership Project; Technical Specification Group Services and System Aspects; General Packet Radio Service (GPRS) enhancements for Evolved Universal Terrestrial Radio Access Network (E-UTRAN) access (Release 10)", 3GPP Standard; 3GPP TS 23.401, 3rd Generation Partnership Project (3GPP), Mobile Competence Centre; 65, Route Des Lucioles; F-06921 Sophia-Antipolis Cedex; France, No. V10.3.0, Mar. 18, 2011, pp. 1-278, XP050476358, 9retrieved on Mar. 18, 2011) Section 4.3.

(Continued)

*Primary Examiner* — Idriss N Alrobaye
*Assistant Examiner* — Richard B Franklin
(74) *Attorney, Agent, or Firm* — Gazdzinski & Associates, PC

(57) ABSTRACT

Methods and apparatus for efficiently transporting data through network tunnels. In one embodiment, a tunneled device advertises certain capabilities to peer devices of a network, and discovers capabilities of peer devices of the network. In a second embodiment, each device of a tunneled network derives a network parameter from a transit protocol parameter for use in data networking.

18 Claims, 7 Drawing Sheets

(56) References Cited

U.S. PATENT DOCUMENTS

2004/0246909 A1* 12/2004 Ahn ............................ 370/252
2011/0134753 A1* 6/2011 Kashyap ...................... 370/231

OTHER PUBLICATIONS

"3rd Generation Partnership Project; Technical Specification Group Services and System Aspects; Service accessibility (Release 10)", 3GPP Standard; 3GPP TS 22.011, 3rd Generation Partnership Project (3GPP), Mobile Competence Centre; 65, Route Des Lucioles; F-06921 Sophia-Antipolis Cedex; France, No. V10.3.0, Apr. 1, 2011, pp. 1-25, XP050476744, (retrieved on Apr. 1, 2011) Section 4.

"3rd Generation Partnership Project; Technical Specification Group Radio Access Network; Synchronisation in UTRAN Stage 2 (Release 10)", 3 GPP Standard; 3GPP TS 25.402, 3rd Generation Partnership Project (3GPP), Mobile Competence Centre; 65, Route Des Lucioles; F-06921 Sophia-Antipolis Cedex; France, No. V10.0.0, Apr. 1, 2011, pp. 1-51, XP050476811, (retrieved on Apr. 1, 2011) Section 6.1.2.1.

* cited by examiner

METHODS AND APPARATUS FOR TRANSPORTING DATA THROUGH NETWORK TUNNELS

PRIORITY

This application claims priority to U.S. Provisional Patent Application No. 61/481,641 filed May 2, 2011 and entitled "METHODS AND APPARATUS FOR TRANSPORTING DATA THROUGH NETWORK TUNNELS", the foregoing being incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The present invention relates generally to the field of computerized devices, networks, and buses. More particularly, in one exemplary aspect, the present invention is directed to efficiently transporting data through network tunnels.

2. Description of Related Technology

Within the context of data networking, a "tunnel" is a network communications channel between networked elements that embeds a network protocol (that is shared by the networked elements) within a transit protocol (which is native to the transit or bearer network). Tunneling is commonly used to logically connect sub-networks that cannot be physically combined. For example, private networks can establish secure tunnels through a public network to create a shared virtual private network. Tunneling can also be used to embed several network protocols over a common transport. For example, the incipient Thunderbolt™ high-speed data bus can support PCI-Express™ (Peripheral Component Interconnect Express) and DisplayPort™ data simultaneously over a single, cost effective interface.

Current implementations of the Thunderbolt interface provide a PCI Express (PCIe) tunnel, DisplayPort (DP) tunnel, and a general-purpose Native Host Interface (NHI)/User Transport Interface (UTI) tunnel within a single serial data interface. During operation, a PCIe stream and DP stream are packetized into Thunderbolt packets for transport. The packets are interleaved together for transmission over a shared Thunderbolt connection, and then de-interleaved into their respective constituent streams at the receiver. Since neither PCIe nor DP data streams are modified in transit, the resulting streams are natively compatible with existing PCI Express and DisplayPort hardware and software.

However, it is widely appreciated that bus protocols widely vary in capabilities and functionality. For example, PCIe does not provide a way to reserve bandwidth for a given data stream. Instead, the PCIe specification defines traffic classes and virtual channels, which can be used to prioritize transactions within a typical PCIe system. Unfortunately, these capabilities have not been included in current Thunderbolt solutions; existing Thunderbolt transceivers do not support virtual channels or traffic classes used within the PCIe protocol. Instead, Thunderbolt transceivers can only prioritize traffic at the Converged Input/Output (CIO) layer (as used herein, the Converged Input/Output (CIO) protocol is the transit protocol for Thunderbolt transceivers). For example, a Thunderbolt transceiver can only prioritize DP traffic over PCIe traffic.

Moreover, Thunderbolt hot-pluggable transports will ideally provide generic, ubiquitous hardware and software interfaces, similar to USB (Universal Serial Bus) and FireWire™ devices. To these ends, current research is directed to minimizing the use of specialty device drivers for Thunderbolt devices, so as to offer "transparent" operation to customers and developers alike.

Accordingly, solutions are needed to prioritize certain types of traffic within tunneled PCIe streams, for use with Thunderbolt transport technology. Ideally, such solutions should not require specialized software or hardware structures, and be effectively transparent to the user. More generally, solutions are needed for enabling certain protocol-specific capabilities within tunneled data networks.

SUMMARY OF THE INVENTION

The present invention satisfies the foregoing needs by providing, inter alia, methods and apparatus for efficiently transporting data through network tunnels.

In one aspect of the present invention, a method for implementing prioritized classes of devices within a network is disclosed. In one embodiment, the method includes: discovering one or more device classes within a network; allocating one or more resources for the one or more device classes; and routing data traffic from the one or more discovered device classes according to the one or more allocated transit resources.

In a second aspect of the present invention, a method for deriving a network protocol parameter from the transit protocol parameter is disclosed. In one embodiment, the method includes: extracting a transit parameter; determining a network parameter based at least in part on the extracted transit parameter; and operating based at least in part on the determined network protocol parameter.

In a third aspect of the invention, a computer-readable storage apparatus is disclosed. In one embodiment, the apparatus includes a storage medium having at least one computer program stored thereon. The at least one program is configured to, when executed, (i) discover one or more device classes, (ii) allocate one or more transit resources for at least one of the discovered one or more device classes, and/or (iii) route data according to the one or more allocated transit resources.

In another embodiment, the at least one program is configured to, when executed, (i) extract a transit parameter, (ii) determine a network parameter from the extracted transit parameter, and/or (iii) operate according to the determined network parameter.

In a fourth aspect of the invention, computerized apparatus configured to prioritize one or more types of traffic with one or more tunneled streams is disclosed. In one embodiment, the apparatus includes a computer, and the tunneled streams are tunneled across a Thunderbolt interface.

In a fifth aspect of the invention, a system for transferring one or more types of traffic with one or more tunneled streams is disclosed. In one embodiment, the system includes a transmitting device, a receiving device, and at least one interposed bearer medium.

In a sixth aspect of the invention, a method for prioritizing data traffic within a network is disclosed. In one embodiment, the method includes: discovering one or more devices associated with one or more prioritized classes within a network; allocating one or more transit resources for the one or more prioritized classes; and only routing data associated with the one or more prioritized classes over the corresponding allocated one or more transit resources.

In one variant, the one or more prioritized classes are based on one or more multimedia data types. For example, the one or more multimedia data types can include audio data. In another such variant, the one or more prioritized classes is based on device type. For example, the one or more device types can include audio devices and non-audio devices. In still other variants, the one or more transmit resources include a direct memory access (DMA) physical resource. For instance, the DMA physical resource is coupled to a host interface via a Native Host Interface (NHI), or alternately, the DMA physical resource is coupled to a peripheral interface via a User Transport Interface (UTI).

In still other variants, each of the one or more discovered devices share a common time reference.

In a seventh aspect of the invention, an apparatus configured to prioritize data traffic within a network is disclosed. In one embodiment, the apparatus includes: one or more network interfaces; a processor; a non-transitory computer-readable medium including at least one computer program stored thereon, the at least one computer program configured to, when executed on the processor: discover one or more peer devices associated with one or more prioritized classes within a network; allocate one or more transit resources for the one or more prioritized classes; and only route data associated with the one or more prioritized classes over the corresponding allocated one or more transit resources.

In one variant, the one or more network interfaces includes a Thunderbolt-compliant network interface. Alternately, the one or more network interfaces includes a Peripheral Component Interconnect Express (PCIe)-compliant network interface. In still other variants, the one or more network interfaces includes a DisplayPort-compliant network interface.

In one variant, the one or more transmit resources include a direct memory access (DMA) physical resource. In other variants, the one or more transmit resources include a dedicated memory buffer.

In an eighth aspect of the invention, a system for implementing prioritized classes of devices within a network is disclosed. In one embodiment, the method includes: determining a synchronization master device for one or more devices of the network; deriving a time reference based on synchronization information provided from by the synchronization master device; and allocating one or more transit resources for a data type supported by one or more devices, where the one or more transit resources are synchronized to the derived time reference.

In one variant, the network includes a plurality of synchronization master devices, where each synchronization master device is associated with a network segment. In one such system, the plurality of synchronization master devices relay synchronization information via one or more boundary devices.

In one variant, the network includes one or more Thunderbolt-compliant devices.

In still other variants, the one or more transmit resources include a direct memory access (DMA) physical resource.

In a ninth aspect of the disclosure, a method for prioritizing data traffic within a network is disclosed. In one embodiment, the method includes discovering one or more devices associated with one or more prioritized classes within a network having a network protocol; reserving, in response to the discovering, one or more transit resources of a transit protocol different than the network protocol for use by the one or more devices associated with the one or more prioritized classes; for at least a period of time, only routing data for the one or more devices associated with the one or more prioritized classes over the corresponding reserved one or more transit resources; where routing the data comprises embedding the network protocol in the transit protocol; and where at least one network protocol parameter is determined based at least in part on a transit parameter of the transit protocol.

In a tenth aspect of the disclosure, an apparatus configured to prioritize data traffic within a network is disclosed. In one embodiment the apparatus includes one or more network interfaces; a processor in data communication with the one or more interfaces; a non-transitory computer-readable medium comprising at least one computer program stored thereon, the at least one computer program configured to, when executed on the processor, cause the apparatus to: (i) discover one or more peer devices associated with one or more prioritized classes within a network; (ii) allocate, in response to the discovery, one or more transit resources for the one or more prioritized classes, the allocated one or more transit resources configured to route data from any of the one or more peer devices associated with the one or more prioritized classes via a direct memory access (DMA) physical resource to a corresponding dedicated memory buffer within the apparatus; and (iii) selectively route data from the one or more peer devices associated with the one or more prioritized classes over the corresponding allocated one or more transit resources.

In an eleventh aspect of the disclosure, a method for implementing prioritized classes of devices within a network is disclosed. In one embodiment, the method includes performing class discovery of one or more devices within a ring network, where each of the one or more devices within the ring network is characterized by only one inbound path and one outbound path; configuring one or more transit resources of the ring network in response to the performed class discovery, where at least a portion of the configured one or more transmit transit resources of the ring network are reserved to route traffic for any of the one or more devices associated with at least a portion of the discovered classes identified by the performed class discovery; and routing traffic from the one or more devices according to the configured one or more transit resources of the ring network.

Other features and advantages of the present invention will immediately be recognized by persons of ordinary skill in the art with reference to the attached drawings and detailed description of exemplary embodiments as given below.

Figure 1:
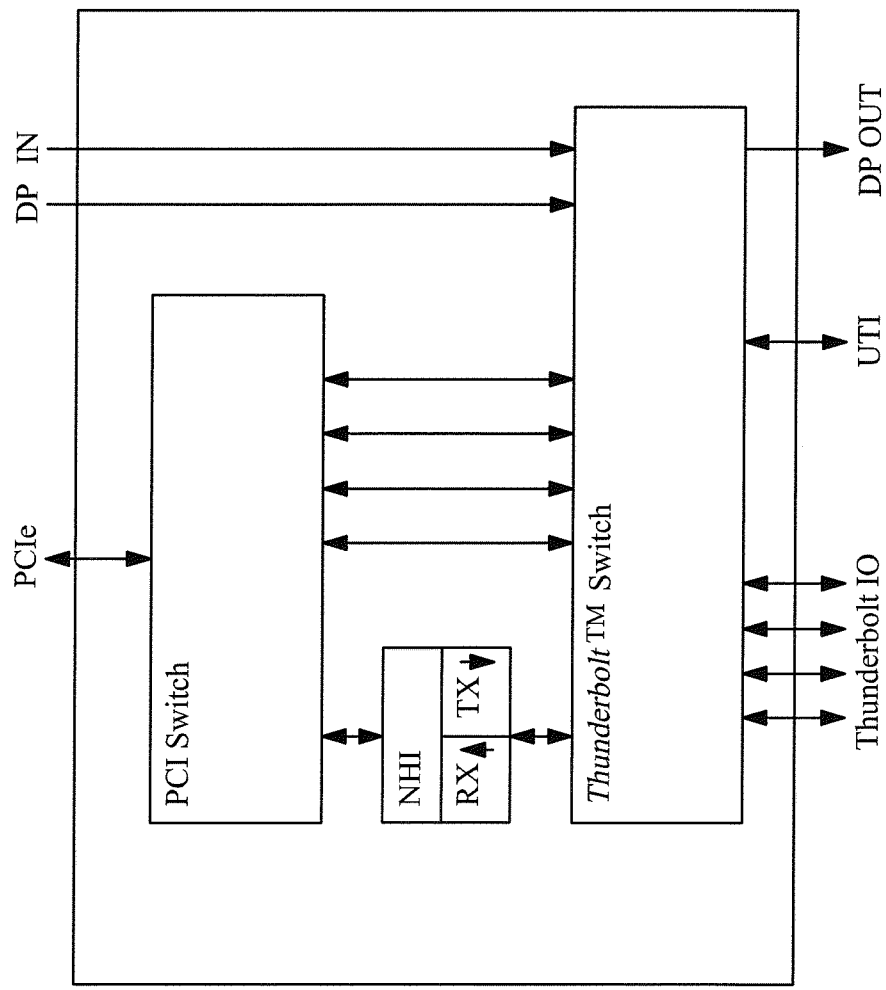
FIG. 1 is a functional block diagram illustrating an exemplary prior art Thunderbolt™ transceiver device.

All Figures © Copyright 2011-2012 Apple Inc. All rights reserved.

DETAILED DESCRIPTION OF THE INVENTION

Reference is now made to the drawings wherein like numbers refer to like parts throughout.

Overview

The present invention provides, inter cilia, methods and apparatus for efficiently transporting data through network tunnels. One exemplary embodiment of the invention is adapted to prioritize a first type of traffic (e.g., audio traffic) over other types (non-audio traffic) for delivery over a Thunderbolt capable network. As described in greater detail herein, Thunderbolt devices will advertise audio capabilities to peer devices of a network, and also discover the audio capabilities of the peer devices.

In a second embodiment of the invention, each audio device associated with a Thunderbolt network utilizes the Thunderbolt time management unit (TMU) to provide network synchronization that improves audio reconstruction, and audio data propagation through the network. The Thunderbolt TMU can provide a highly accurate and precise time reference that is common across all Thunderbolt audio devices.

Detailed Description of Exemplary Embodiments

Exemplary embodiments of the present invention are now described in greater detail. While these embodiments are discussed primarily in terms of existing Thunderbolt™ high-speed data buses and PCI-Express™ (Peripheral Component Interconnect Express) and DisplayPort™ protocols, it will be recognized by those of ordinary skill that the present invention is not in any way limited to the foregoing technologies or protocols. In fact, various aspects of the present invention can be adapted for use in any network that is capable of tunneling one or more network protocols over one or more transport technologies.

Similarly, while the following discussions are presented with respect to audio data and audio data networks, it will be recognized by those of ordinary skill that the present invention is not in any way limited to audio data. In fact, various aspects of the present invention can be adapted for use in any data type which may be prioritized over other data. Common examples include multimedia data (e.g., audio data, video data, etc.), application specific data, and real-time data.

As used herein, the term "network" refers without limitation to any network or apparatus configured to transfer data as suitably-sized groupings called packets. Packet networks can deliver streams of data (composed of sequences of packets) to a community of devices. During transfer, packets are buffered and queued, and may experience variable delays and throughput depending on the traffic load in the network. Common examples of packet-based networks include the Internet (i.e., the global system of interconnected computer networks), as well as privatized internets, and intranets.

As used herein, the term "source" refers without limitation to a device or interface configured to packetize information for transfer via a packet-based network. The terms "destination", "target", and/or "sink" refer without limitation to a device or interface configured to extract information from a packet.

Moreover, the term "endpoint" refers generally and without limitation to the portion of a device that is a "source" and/or "destination" of information in a communication flow between devices. Similarly, as used herein, a "node" refers without limitation to a device that receives packets, and forwards the packets to another device.

These definitions should in no way be considered limiting; e.g., a client device or other entity may or may not include a logical or physical "endpoint" and/or "node" within the network.

It is further appreciated that a device may (and generally will) simultaneously implement source, destination and node functionalities; the foregoing distinctions being made only for the purposes of clarifying various aspects of the present invention.

Furthermore, while some embodiments are shown in the context of a wired data bus or connection, the invention is equally applicable to wireless alternatives or interfaces such as, without limitation, WLANs such as IEEE Std. 802.11 wireless networks, WMANs such as IEEE Std. 802.16 wireless networks, personal area networks (PANs), Bluetooth™, infrared, and optical communication links.

Exemplary Prior Art Thunderbolt™ Transceiver—

FIG. 1 illustrates one exemplary prior art Thunderbolt transceiver 100 useful in conjunction with various aspects of the present invention. As shown, the Thunderbolt transceiver includes: (i) one or more PCI Express (PCIe) interfaces, (ii) one or more DisplayPort (DP) interfaces, (iii) one or more Thunderbolt interfaces, (iv) one or more User Transport Interface(s) (UTI), (v) a PCIe switch, (vi) a Native Host Interface (NHI), and (vii) a Thunderbolt switch. Current implementations of the Thunderbolt transceiver limit the DP interfaces to DP data only; all other traffic is handled as PCIe data.

During operation, the NHI communicates with a local host processor through the single external PCIe connection. The local host processor can configure the Direct Memory Access (DMA) engines within the NHI to read and/or write to system memory that is accessible via the PCIe bus. Existing Thunderbolt transceivers have one external PCIe connection used for all Thunderbolt command transactions, control transactions, and all non-Display Port data flow, including NHI. Peripherals typically use the UTI interface, which connects to the Thunderbolt switch and provides raw access to the UTI Thunderbolt packets. As shown, the device of FIG. 1 has both an NHI and UTI which enables both host and peripheral operation (e.g., a host only device would not have a UTI, a peripheral only device would not have a NHI).

A host processor can access a peripheral device PCIe registers via its own NHI interface. The transaction is tunneled via the Thunderbolt switch to a peripheral device; where the access is directed through the UTI to access the PCIe registers. Similarly, peripherals can perform accesses to a host via their UTI (through the Thunderbolt network) to the host's NHI. Similarly, host to host transactions (for multi-host systems) can be performed NHI to NHI, and peripheral to peripheral transactions (for multi-peripheral systems) can be performed UTI to UTI.

Figure 2:
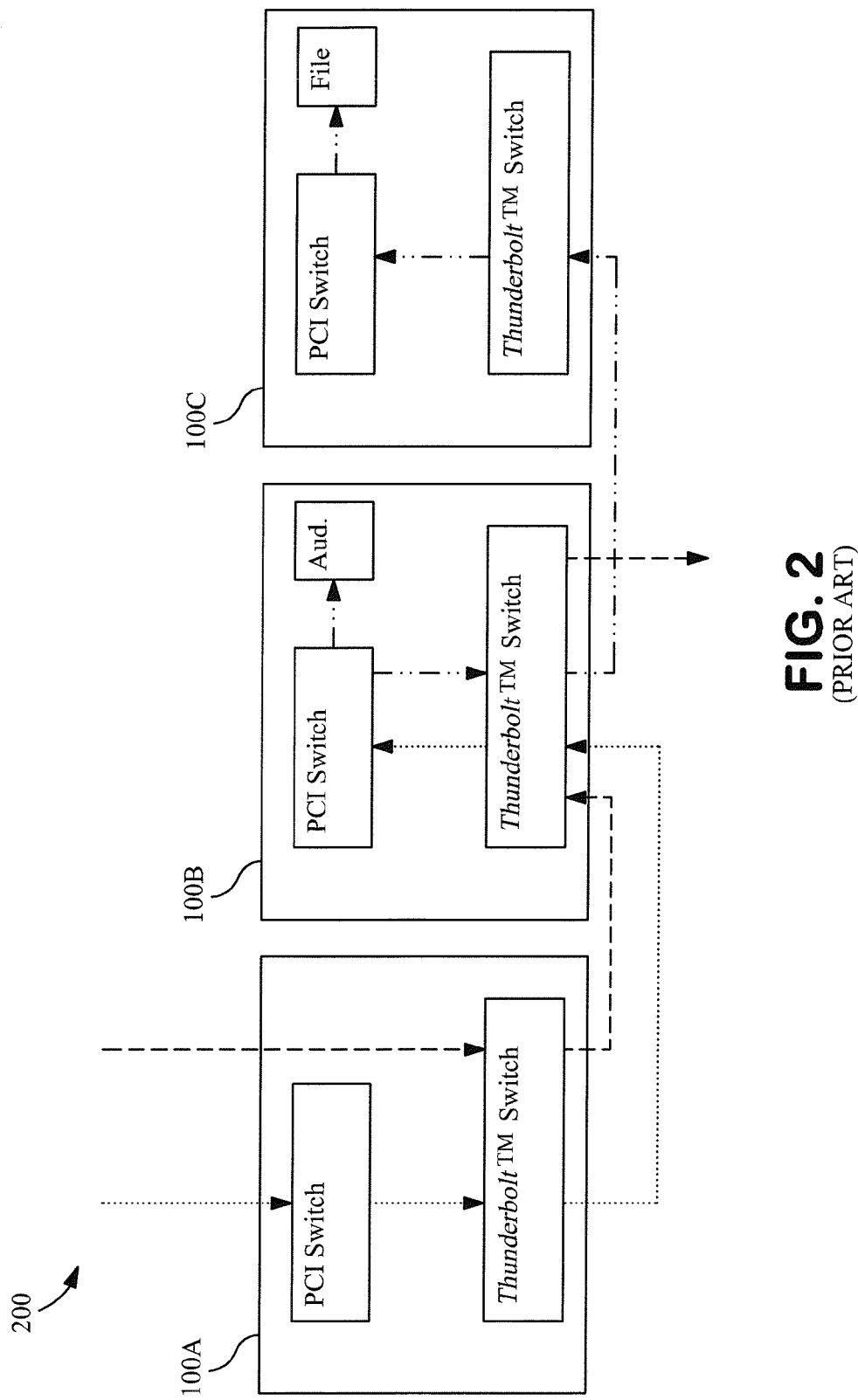
FIG. 2 is a functional block diagram illustrating one exemplary use scenario involving several connectivity capabilities of the prior art Thunderbolt™ transceiver device of FIG. 1.

FIG. 2 depicts one exemplary use scenario 200 of first, second, and third prior art Thunderbolt transceivers (100A, 100B, 100C), illustrating various connectivity capabilities. As shown, a first device receives a first PCIe data stream (consisting of audio data and a file transfer), and a first DP data stream. The first device 100A packetizes the first PCIe data stream and first DP data stream for transmission over a first Thunderbolt high-speed serial bus, and transmits a first Thunderbolt data stream.

The second device 100B receives the first Thunderbolt data stream, and unpacks the data into a second PCIe stream and second DP data stream. The second DP data stream drives an output DP interface. The second PCIe stream is further divided into its constituent audio data and file transfer streams. The audio data drives a USB audio output. The remaining file transfer is re-packed into a second Thunderbolt data stream for transmission over a second Thunderbolt high speed serial bus.

The third device 100C receives the second Thunderbolt data stream, and unpacks the data into a third PCIe stream. The third PCIe stream drives a file transfer.

Audio Networking—

As previously described, the DP interface only carries DP data; i.e., all non-DP data is typically tunneled through the single PCIe link. Unfortunately, audio data can be delayed enough to cause audio stream interruptions, especially when the PCIe link is heavily congested with other non-audio traffic. Moreover, unlike other bus protocols such as Fire Wire and USB (Universal Serial Bus), PCIe does not provide a mechanism for explicitly reserving bandwidth. Furthermore, as previously stated, prior art Thunderbolt transceivers can only prioritize traffic at the Converged Input/Output (CIO) layer (i.e., interleaving of the tunneled PCIe and DP packets).

Accordingly, various embodiments of the present invention are adapted to resolve the aforementioned deficiencies in prior art transceivers. In one embodiment, Thunderbolt devices advertise audio capabilities to peer devices of a network, and discover audio capabilities of peer devices of the network, thereby enabling devices to prioritize audio traffic over non-audio traffic. In a second embodiment, each audio device of a Thunderbolt network utilizes the Thunderbolt time management functionality to provide network synchronization which advantageously both improves audio reconstruction, and audio data propagation through the network.

For example, in one exemplary implementation, a MacOS X™ Thunderbolt driver (developed and distributed by the Assignee hereof) is configured to discover all connected Thunderbolt devices, and determine an associated device class (or default class if not otherwise indicated). Transactions with Thunderbolt Audio Class devices are classified at a higher priority level than other PCIe transactions. In some variants, additional types of device classes may exist, each having a priority relative to other device classes (e.g., a hierarchy of classes or types).

Specifically, the MacOS X Thunderbolt Audio Class driver determines a list of Thunderbolt Audio Class devices, along with relevant parameters for the Thunderbolt network; e.g., (i) bandwidth that is available for audio, (ii) total bandwidth, and/or (iii) consumed bandwidth. Each Thunderbolt device advertises its capabilities to the MacOS X Thunderbolt Audio Class driver using a descriptor model. For example, in one such embodiment, the descriptor is a data structure in the audio device's PCIe-accessible memory. Various aspects of audio device operation can be controlled via PCIe-accessible registers by the MacOS X Thunderbolt Audio Class driver.

Furthermore, in a secondary exemplary embodiment of the invention, the Thunderbolt Time Management Unit (TMU) of the Thunderbolt transceiver is used for device-level time synchronization, and also as the basis for audio sample clock reconstruction. The Thunderbolt TMU provides a highly accurate and precise time reference that is common across all Thunderbolt audio devices, although it will be appreciated that other time bases or reference sources may be used consistent with the invention. For example, existing implementations of the Thunderbolt TMU can maintain device synchronization to within ten nanoseconds (10 ns) across a Thunderbolt network.

During operation, the MacOS X Thunderbolt Audio Class driver can configure an audio source device to write its samples to another destination device's buffer before a specified deadline. Similarly, the destination device will not consume the samples until after the deadline has passed. The precision of the shared time reference (generated at each device by the TMU) ensures that both source and destination devices can utilize the same time reference, with minimal consideration for skew. Additionally, each device of the Thunderbolt network monitors one or more sample buffers (e.g., the device's own buffers, and/or a peer device's buffers) to prevent and/or resolve buffer under-runs and buffer over-runs.

Finally, in some variants of the invention, the Thunderbolt TMU is used to reconstruct the audio sample clock, thereby providing a synchronized, reconstructed high quality audio clock signal at each device of the network.

Two exemplary embodiments of the present invention are now described in greater detail to further illustrate the foregoing principles.

Native Host Interface (NHI), User Transport Interface (UTI)

In a first exemplary embodiment of the invention, the audio class devices are allocated a dedicated Converged Input/Output (CIO) tunnel. Each Thunderbolt Audio Class device is connected to the dedicated audio class CIO tunnel, and only audio samples are transmitted through the dedicated CIO tunnel. Since the audio class CIO tunnel is a prioritized tunnel, the audio samples can arrive at their destination in a timely fashion regardless of other PCIe traffic. In one such embodiment, the dedicated audio class CIO tunnel is implemented via the Thunderbolt transport to the Native Host Interface (NHI)/User Transport Interface (UTI). The host writes to its NHI which tunnels through the Thunderbolt network to the first peripheral's UTI, the first peripheral's UTI tunnels through the Thunderbolt network to another device (e.g., to a second peripheral's UTI, or back to the host's NHI). In this manner an arbitrarily long "ring" of devices can be made. The local host processor configures the NHI DMA engines to read/write audio data samples to/from the local host processor's system memory, which are then tunneled through the ring network.

Existing implementations of the Thunderbolt transceiver only provide a single CIO tunnel in each direction per UTI interface. Accordingly, existing NHI/UTI implementations have several notable limitations. Specifically, a single NHI/UTI interface can only service multiple devices in a so-called "ring" topology; i.e., each Thunderbolt Audio Class device reads from one peer device, and writes to one peer device to transfer audio samples (even though their PCIe-based control connections are logically arranged as a bus). The UTI signal pair (which operates at 2.5 gigatransfers per second (GT/s) in each direction) can establish a per-ring limit of approximately one thousand 48 kilohertz (kHz), 32-bit audio channels which is sufficient for simple arrangements, but which can be quickly overwhelmed in more complex configurations.

In some use scenarios, a ring topology is desirable. For example, ring topologies are relatively resource efficient, as a ring topology only consumes one inbound and one outbound path for each device. Another advantage is that Thunderbolt Audio Class devices can pass packets with extremely low latency (less than the amount of time it takes to transmit an entire packet) due to the simple delivery structure (i.e., no need for address resolution, bus contention, etc.).

However, in other use scenarios, a ring topology may be undesirable; for example, while latency through a Thunderbolt Audio Class device could be made very small (a fraction of a millisecond), latencies through other types of devices (such as for example a Macbook™ type device, manufactured by the Assignee hereof) can be dominated by internal processing time and may be significantly longer (several milliseconds). Since a ring topology is unidirectional, audio latency between any two devices will vary significantly depending on whether or not the audio sample data flows through such longer latency devices or not. Furthermore, latencies will increase with the number of devices participating in the ring, and ring traffic must be interrupted any time a device is added to/or removed from the ring (a new ring must be formed each time the topology changes).

Still other limitations of the NHI/UTI approach may be related to device types of the network. For example, a Macbook type device will use Thunderbolt NHI DMA engines for transmitting and receiving the CIO packets. DMA operation requires the use of an intermediate buffer (in system memory), which is undesirable in certain applications.

Moreover, DMA system memory is accessed with so-called "non-posted" PCIe read transactions that are transactionally "expensive". As a brief aside, PCI Express supports so-called "posted" and "non-posted" transactions. In PCIe, a typical transaction (i.e., a non-posted read or write) is acknowledged with a completion Transaction Layer Packet (TLP). The TLP completion packet confirms to the transmitter that the receiver (or "completer") has received the request. For read requests, the completions include the returned read data if successful, or an error status if unsuccessful. For write requests, the completions include an acknowledgment of receipt if successful, or an error status if the write did not complete successfully. In contrast, a posted transaction does not provide any acknowledgment (even when the transaction is unsuccessful). PCIe does not support a posted read.

However, the aforementioned limitations of the NHI/UTI approach may be less significant in certain implementation scenarios (e.g., where small numbers of connected devices are expected, where predominantly Thunderbolt Audio Class devices are used, etc.). Alternately, future improvements to device technology may obviate such limitations altogether (e.g., where future implementations provide additional UTI interfaces, improve device latencies, etc.).

PCI Express (PCIe)—

In a second exemplary embodiment of the present invention, each audio class device allocates memory for all audio channels that are to be received from the network. During operation, audio data is "pushed" through the PCIe tunnel; i.e., audio streams are written by the source device directly into memory buffers on the destination device. In one implementation, the write transactions are "posted"; i.e., do not require acknowledgement transfers between the destination and source device. In some embodiments, the write transactions are further handled with a programmed I/O (Direct Memory Access).

This Thunderbolt PCIe unified addressing model can natively support peer-to-peer audio routing. This capability enables Thunderbolt PCIe devices to access any other Thunderbolt Audio Class device on the Thunderbolt network. More generally, unlike the ring topology described supra, the Thunderbolt network can be physically arranged as a so-called "tree", which can support each PCIe device with logical bus addressing (enabling more direct routing).

Moreover, unlike the aforementioned NHI/UTI scheme, this approach does not require a dedicated CIO resource, and can be tunneled through existing PCIe allocations. CIO resources are limited in current device solutions; however, if higher performance is desired (and CIO resources are available), Thunderbolt Audio Class devices can be allocated their own high-priority branch of the Thunderbolt PCIe tree (i.e., Thunderbolt Audio Class devices are attached to a dedicated logical bus). Such implementations will increase the chances of audio packets arriving at their destination in a timely manner, especially in the case of peer-to-peer transactions.

Furthermore, the PCIe approach can be performed entirely with posted write transactions. Specifically, the aforementioned NHI/UTI ring topology requires that each device must still perform PCIe read transactions into an intermediate buffer, and PCIe write transactions from the intermediate buffer. Such PCIe read transactions are non-posted; i.e., require confirmation. In contrast, the PCIe approach (without using the NHI/UTI) can take full advantage of PCIe "posted" write transactions which maximize throughput and minimize latency, since no response is required from the destination device. For example, an exemplary Macbook processor can write samples directly to the PCIe device, without being required to use an intermediate buffer in conjunction with a Direct Memory Access (DMA) engine.

Method—

Generalized methods of the present invention are now described in greater detail.

In one aspect of the invention, devices can advertise various prioritized classes to peer devices of a network, and discover prioritized classes of peer devices of the tunneled network. Tunnel resources (or "transit" resources) are allocated to the various prioritized classes supported by the network tunnels.

In a second aspect, each device of the tunneled network extracts one or more parameters from a transit protocol, wherein each device can derive a network protocol parameter from the transit protocol parameter.

Figure 3:
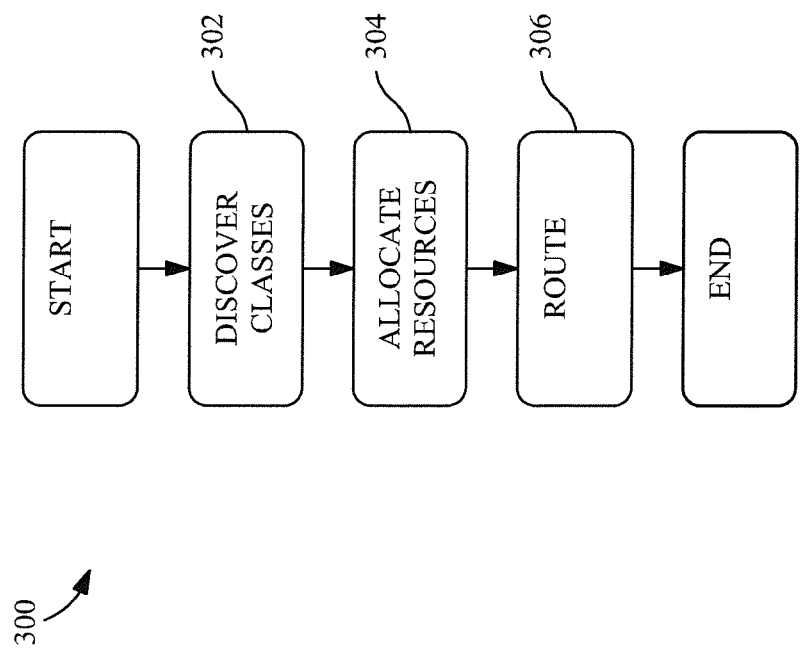
FIG. 3 is a logical flow diagram of one exemplary embodiment of a method for implementing prioritized classes of devices within a network in accordance with the present invention.

Referring now to FIG. 3, one exemplary embodiment of the method 300 for implementing prioritized classes of devices within a network is described. In one embodiment, prioritized classes are based on media type. Alternatively, priority classes may be based on device applications, device capabilities, device types, etc. For example, devices may be classified as audio devices, and non-audio devices. In another such example, devices may be classified according to (but not limited to): (i) throughput, (ii) latency, (iii) asynchronicity, (iv) isochronicity, and/or (v) reliability. In still other examples, devices may be classified according to device type (e.g., Host device, Slave device, Boundary device, Hub device, etc.)

At step 302 of the method 300, each device performs class discovery for the tunneled network. For example, in one exemplary embodiment, each device executes software configured to discover peer device classes (or assign one or more default classes if not otherwise indicated). Devices may advertise their appropriate device classes to other devices of the tunneled network. Alternatively, devices query peer devices for their device classes. In still other implementations, devices register their device class with a central network entity (such as a network master, registry service, etc.), and retrieve registered peer device classes from the central network entity.

In one exemplary scenario, each Thunderbolt device advertises its capabilities to other Thunderbolt devices using a descriptor model. For example, the descriptor may include a data structure, accessible via a network protocol. The network protocol may be e.g., PCI Express (PCIe). For instance, a device may identify itself as an audio device within a PCIe memory accessible via the Thunderbolt protocol. In yet other scenarios, one or more devices may be network management entities, for example, a MacOS X Thunderbolt driver may function as a central network management entity, performing device discovery and device management for the network.

Once all devices of the network have been classified, the resulting list of devices and their associated classes may be compiled into a network listing, and provided to each device (or a subset thereof). In some embodiments, the network listing may additionally be augmented with other relevant parameters such as total bandwidth available, consumed bandwidth, bandwidth limitations, etc.

At step 304 of the method 300, one or more transit resources are allocated for one or more prioritized classes of the network. In one embodiment, one or more classes of the network are allocated a dedicated transit resource. Transit resources may be physical or virtual resources used in the network tunneling process. For instance, in one such variant, transit resources may include logical paths, logical channels, etc. In other cases, transit resources may include physical processing resources (e.g., Direct Memory Access (DMA), etc.), physical paths, physical channels, etc.

Data traffic can also be allocated to a physical resource such as a dedicated input, memory buffer, and dedicated output. For example, as previously described supra (see *Native Host Interface (NHI)*, *User Transport Interface (UTI)*), audio data traffic can be allocated to a NHI/UTI DMA physical resource. In another example, as previously described supra (see *PCI Express (PCIe)*), each device allocates a PCIe accessible memory buffer within internal system memory for audio data traffic.

At step 306 of the method 300, prioritized traffic is routed according to the one or more allocated transit resources.

Figure 4:
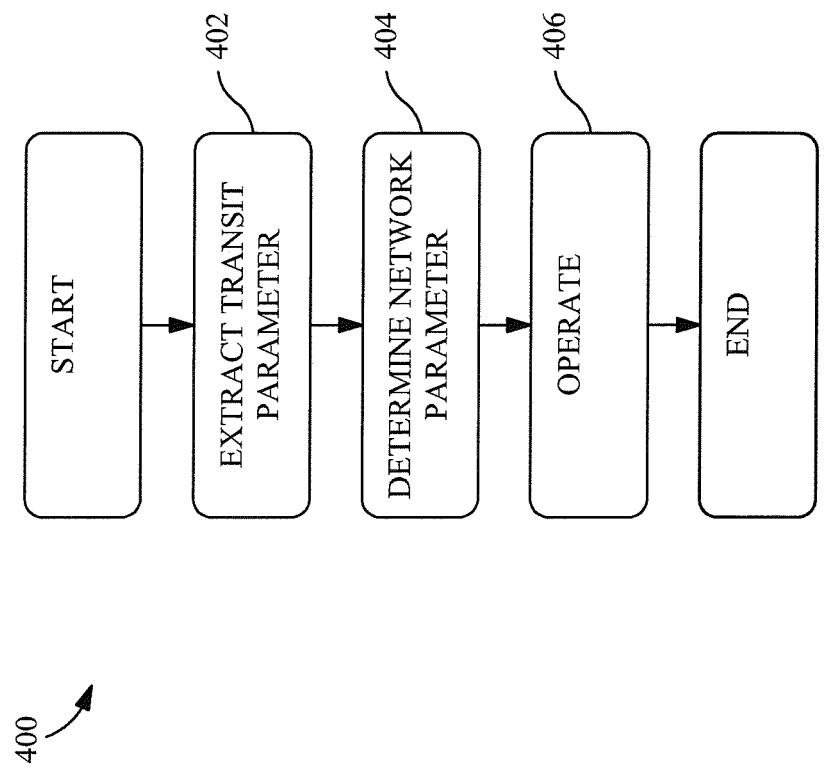
FIG. 4 is a logical flow diagram of one exemplary embodiment of a method for deriving a network protocol parameter from a transit protocol parameter in accordance with the invention.

Referring now to FIG. 4, one exemplary embodiment of the method 400 for deriving a network protocol parameter from the transit protocol parameter is described. In one implementation, time synchronization is determined from a transit timestamp parameter that is distributed throughout the network. For example, a Thunderbolt Time Management Unit (TMU) can generate device-level time synchronization for audio sample clock reconstruction.

At step 402 of the method 400, each device extracts a transit protocol parameter. Common examples of transit protocol parameters include, but are not limited to: time, bandwidth, error checking capabilities, etc. In one exemplary embodiment, each device extracts a timestamp from the transit protocol. In another such embodiment, each device determines a total network bandwidth supported by the transit network.

It is of particular note that the transit protocol is shared by all connected devices, regardless of their executed applications, or the tunneled network protocol, etc. For example, all devices of a Thunderbolt network will share a common Thunderbolt time reference regardless of the Thunderbolt device's internal time reference, application software, etc. Accordingly, the underlying transit protocol can advantageously be used to synchronize the activity of the Thunderbolt-connected devices.

At step 404, each device determines network protocol parameter, based at least in part on the transit protocol parameter.

As a brief aside, Thunderbolt transceivers contain advanced Time Management Units (TMUs), which accurately and precisely convey the Thunderbolt network time to each device on the Thunderbolt network. During typical operation, a synchronization master is elected for the Thunderbolt network. The synchronization master transmits synchronization information to the devices residing on its network segment. Each device locally calculates a clock reference based on the synchronization information. Boundary devices can relay accurate time to other segments enabling synchronization between the synchronization masters. In this manner, the entire network can by synchronized to very fine tolerances. For example, in Thunderbolt device networks, any two devices will vary in time by no more than ten nanoseconds (10 ns). Thunderbolt transceivers use a simple, one-wire protocol called the Serial Time Link Protocol (STLP) to communicate the current Thunderbolt time to other chips on the printed circuit board. Another example of such time synchronization across distributed networks includes (but is not limited to) the IEEE 1588 Precision Time Protocol (PTP).

In one exemplary embodiment of the invention, the transit parameter is used to determine a network protocol parameter. For example, in a Thunderbolt transceiver, the Thunderbolt network time is used to determine network time for a PCI Express (PCIe) network protocol. In alternate embodiments, the Thunderbolt network time can be used to synchronize the DisplayPort (DP) network protocol. Moreover, devices may determine one or more network parameters based on the available transit bandwidth (for example, quality of service (QoS), suitable encoding schemes, etc.).

At step 406, each device operates based on the determined network protocol parameter, where the determined network protocol parameters for each of the devices are substantially similar. For example, during Thunderbolt operation, the embedded PCIe network protocol can use the derived network time to schedule transmissions, and/or receptions of data.

Moreover, in some variants of the invention, the derived network time is also used to assist in data processing and/or consumption. For example, the derived network time can be used as an accurate and precise time reference for audio processing. In one such implementation, the derived time reference ensures that audio data is written and read to system memories at appropriate times (reading a buffer too early or writing a buffer too late can introduce undesirable data hazards).

Other common uses for the derived time reference include, but are not limited to: measuring audio sample clocks to ensure that all audio clocks are operating in concert, scheduling the transfer of audio samples from one device to another, and monitoring PCIe performance of audio sample transfers.

Exemplary Apparatus—

Figure 5:
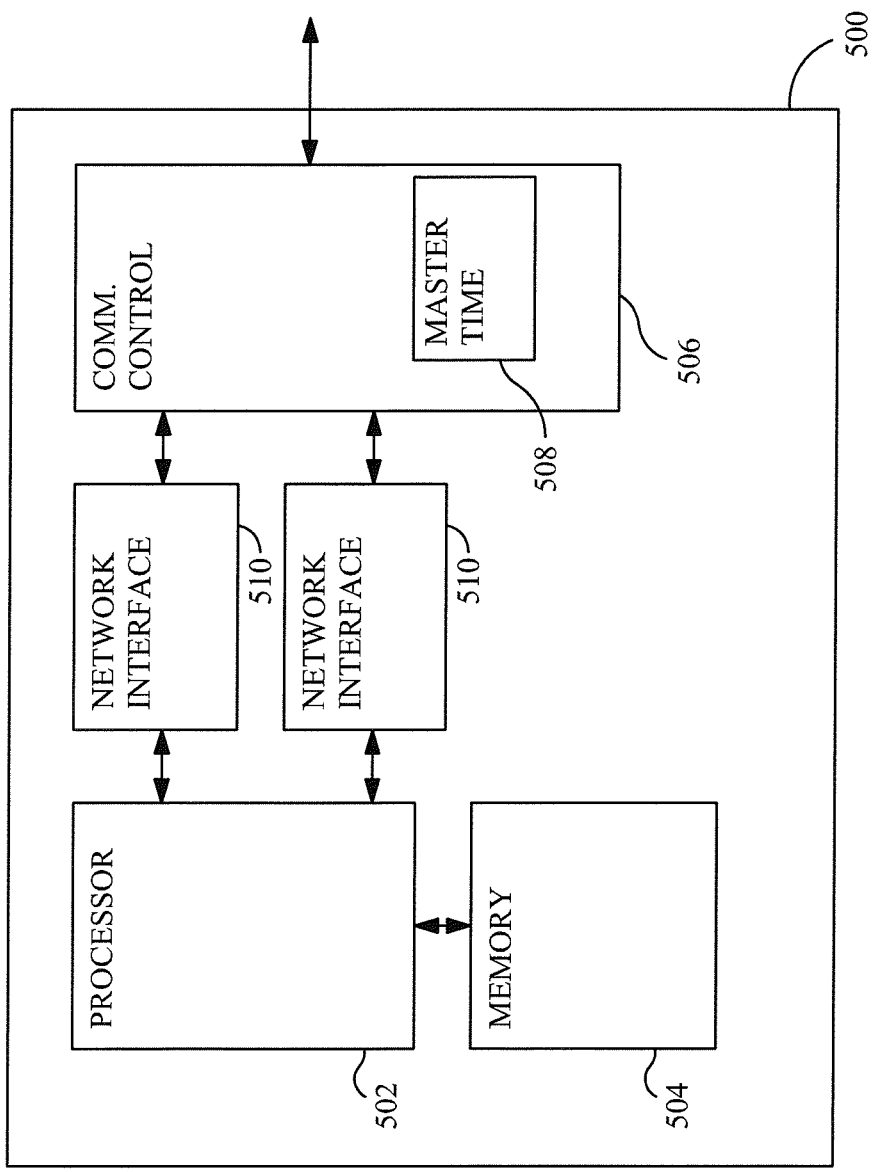
FIG. 5 is one exemplary embodiment of a computerized apparatus useful for implementing various methods and aspects of the present invention.

FIG. 5 illustrates one exemplary embodiment of an apparatus 500 useful for implementing various methods and aspects of the present invention. The apparatus of FIG. 5 includes a processor subsystem 502 such as a digital signal processor, microprocessor, field-programmable gate array (FPGA), or plurality of processing components mounted on one or more substrates. The processing subsystem may also include an internal cache memory. The processing subsystem is in communication with a memory subsystem 504 including memory which may for example, include SRAM, Flash and SDRAM components. The memory subsystem may implement one or a more of DMA type hardware, so as to facilitate data accesses as is well known in the art. The memory subsystem contains computer-executable instructions that are executable by the processor subsystem.

Additionally, the apparatus includes a tunnel communications controller 506, which manages a data tunnel between endpoints. The tunnel communications controller is in operative communication with one or more network interfaces 510. The network interfaces are further configured to transmit and/or receive packetized traffic. In one embodiment, tunnel communications controller is configured to tunnel the packetized traffic from the one or more network interfaces for delivery over a transit network. The tunnel communications controller interleaves packets for transmission over the transit network. Received data is de-interleaved into appropriate packets, and routed to the appropriate network interface.

The communication controller 506 is further configured to track a master time base 508. This master time base may be derived from an internal clock such as an internal oscillator circuit (e.g., Voltage Controlled Temperature Controlled Crystal Oscillator (VCTCXO), etc., or may be reported or received from an external device or entity, such as a peer device providing a Serial Time Link Protocol (STLP), Global Positioning System (GPS), IEEE Std. 1588 (Precision Time Protocol), etc.

In one exemplary embodiment of the apparatus 500, the one or more network interfaces 510 include at least a PCI Express (PCIe) interface, and a DisplayPort interface. Common examples of other network interfaces useful with the invention include but are not limited to: Universal Serial Bus (USB), FireWire (IEEE Std. 1394), Ethernet, High Definition Multimedia Interface (HDMI), Digital Visual Interface (DVI), and DisplayPort. In some variants, the one or more network interfaces are further configured for use with a DMA type memory and associated DMA engine for executing large memory transfers.

As previously described, network protocol traffic is packetized for transmission over the transit network. Packetized data is data that has been formatted into discrete units or packets of data. Each packet includes at least routing information and payload. The routing information provides e.g., source and destination addresses, error detection codes, and sequence information. Additionally, certain types of data packets may contain presentation information, for example, media packets (such as audio data and video data), can have an associated playback time to ensure that media is played back at a regular, and smooth rate.

In some embodiments of the present invention, the packetized traffic may or may not provide various guarantees for reliability. For example, "non-posted" transactions may provide explicit acknowledgment (ACK) or non-acknowledgement (NAK), whereas "posted" transactions may not provide any feedback as to transmission success or failure.

Referring back to FIG. 5, the user interface subsystem 510 is coupled to the processing subsystem 502, and may include any number of well-known I/O including, without limitation: a keypad, touch screen (e.g., multi-touch interface), audio/visual (AV) system, backlight, speaker, and/or microphone. However, it is recognized that in certain applications, one or more of these components may be obviated.

Figure 6:
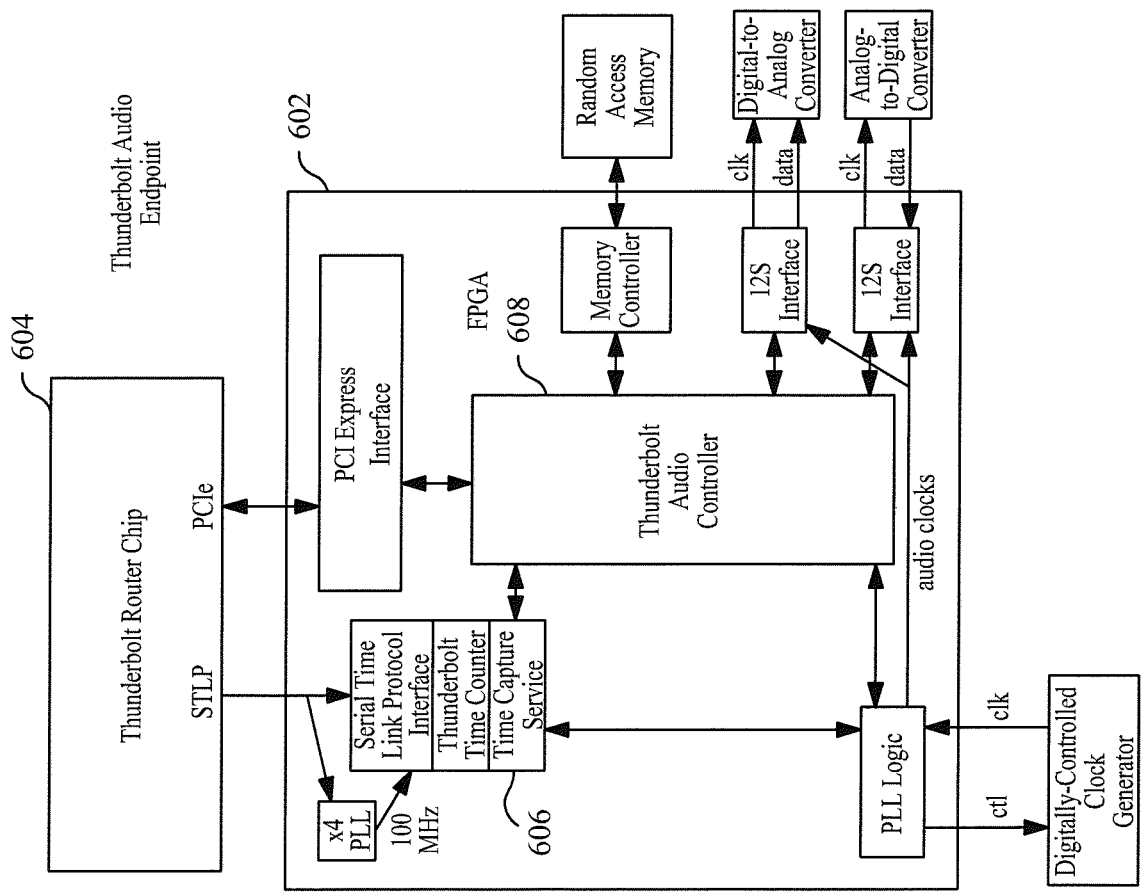
FIG. 6 is a block diagram illustrating one implementation-specific embodiment of a Thunderbolt™ transceiver device according to the invention.

FIG. 6 illustrates one specific implementation (Thunderbolt-based) of a peripheral apparatus 600 implementing various methods and aspects of the present invention. The apparatus of FIG. 6 includes a field-programmable gate array (FPGA) 602, coupled to a Thunderbolt router chip 604. The FPGA is also coupled to time generation logic 606, and an audio controller 608. During exemplary operation, The field programmable gate array (FPGA) 602 uses the STLP protocol to synchronize a local counter to Thunderbolt network time; thereby, providing timing services for the other logic within the FPGA. Audio samples destined for this Thunderbolt peripheral would be written via PCIe to the RAM (random access memory) attached to the FPGA by a predetermined time deadline. Once the deadline has passed, the Thunderbolt Audio Controller 608 reads the samples from RAM and feeds them to the I2S output driving the Digital to Analog Converter. Audio clocks for operating the $I^2S$ (Integrated Interchip Sound™) interface and associated converters are generated by a PLL (Phase Locked Loop) that generates clocks based on the Thunderbolt time and timestamps received via PCIe.

Similarly, the $I^2S$ interface connected to the ADC will run at the rate determined by the audio PLL and produce samples that are written to the RAM by the Thunderbolt Audio Controller. At the prescribed time, the controller will write the samples to the configured destination address over the PCIe connection.

Figure 7:
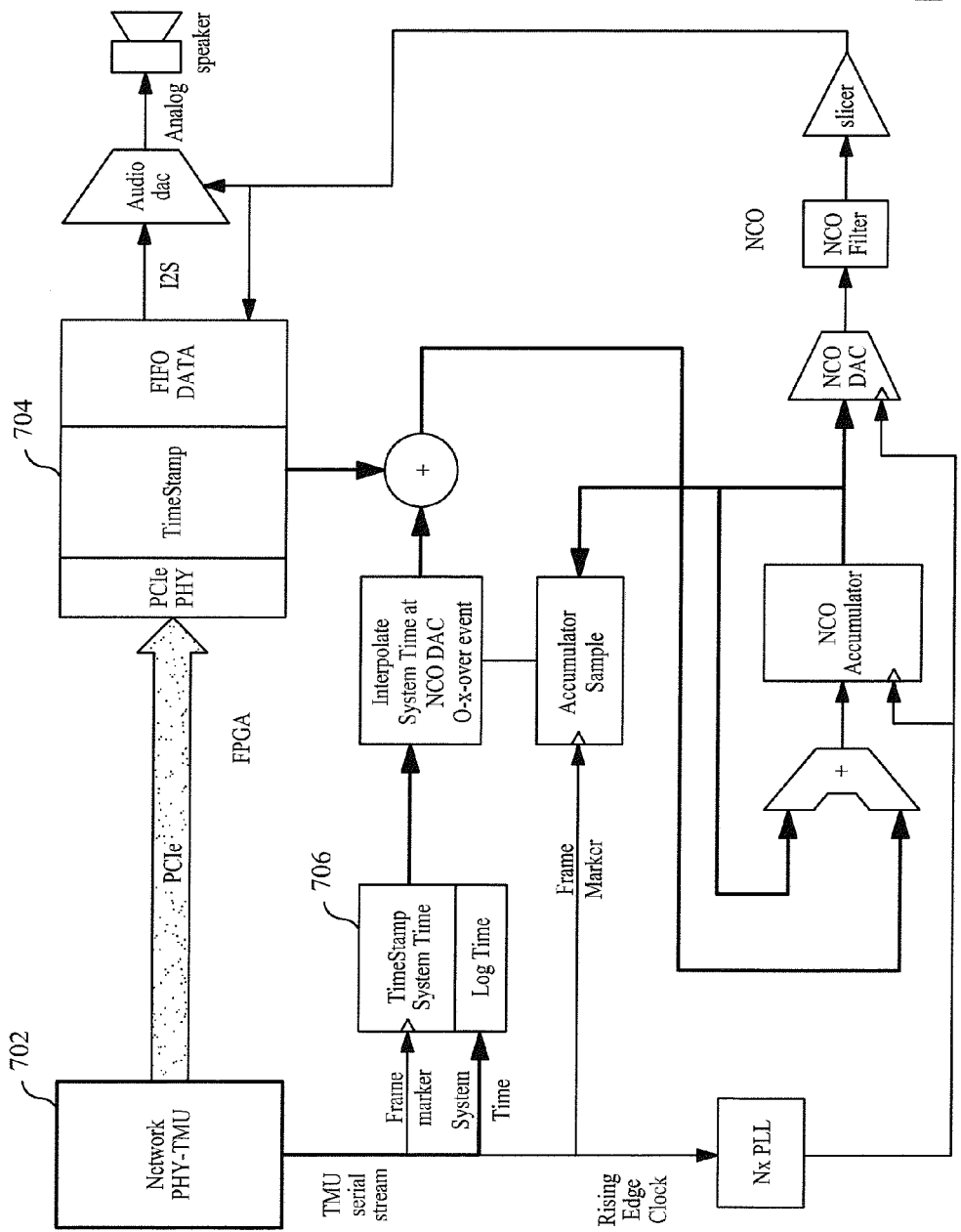
FIG. 7 is a block diagram illustrating one exemplary embodiment of an apparatus useful for generating synchronized audio sample clocks from the reference time provided by the Thunderbolt device of FIG. 6.

FIG. 7 illustrates one specific solution for generating synchronized audio sample clocks from the Thunderbolt reference time. As shown, time stamps are received at the TMU 702, and distributed to the PCIe physical layer (PHY) 704, and clock generation circuit 706. The PCIe PHY relies on the reference time to ensure that data is read into/out of the memory at appropriate times. The clock generation circuit uses the system time to generate a high precision clock which is used to read from the audio data FIFO, and synthesize audio signals.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. A method for prioritizing data traffic within a network, comprising:
   discovering one or more devices associated with one or more prioritized classes within a network having a network protocol;
   reserving, in response to the discovering, one or more transit resources of a transit protocol different than the network protocol for use by the one or more devices associated with the one or more prioritized classes;
   for at least a period of time, only routing data for the one or more devices associated with the one or more prioritized classes over the corresponding reserved one or more transit resources;
   where routing the data comprises embedding the network protocol in the transit protocol; and
   where at least one network protocol parameter is determined based at least in part on a transit parameter of the transit protocol.

2. The method of claim 1, wherein the one or more prioritized classes are based on one or more multimedia data types.

3. The method of claim 2, wherein the one or more multimedia data types comprise audio data.

4. The method of claim 1, wherein the one or more prioritized classes is based on one or more device types.

5. The method of claim 4, wherein the one or more device types comprise audio devices and non-audio devices.

6. The method of claim 1, wherein the one or more transit resources comprise a direct memory access (DMA) physical resource.

7. The method of claim 6, wherein the DMA physical resource is coupled to a host interface via a Native Host Interface (NISI).

8. The method of claim 6, wherein the DMA physical resource is coupled to a peripheral interface via a User Transport Interface (UTI).

9. The method of claim 1, wherein each of the one or more discovered devices share a common time reference.

10. An apparatus configured to prioritize data traffic within a network, comprising:
   one or more network interfaces;
   a processor in data communication with the one or more interfaces;
   a non-transitory computer-readable medium comprising at least one computer program stored thereon, the at least one computer program configured to, when executed on the processor, cause the apparatus to:
      discover one or more peer devices associated with one or more prioritized classes within a network;
      allocate, in response to the discovery, one or more transit resources for the one or more prioritized classes, the allocated one or more transit resources configured to route data from any of the one or more peer devices associated with the one or more prioritized classes via a direct memory access (DMA) physical resource to a corresponding dedicated memory buffer within the apparatus; and
      selectively route data from the one or more peer devices associated with the one or more prioritized classes over the corresponding allocated one or more transit resources.

11. The apparatus of claim 10, wherein the one or more network interfaces comprises a Thunderbolt-compliant network interface.

12. The apparatus of claim 10, wherein the one or more network interfaces comprises a Peripheral Component Interconnect Express (PCIe)-compliant network interface.

13. The apparatus of claim 10, wherein the one or more network interfaces comprises a DisplayPort-compliant network interface.

14. A method for implementing prioritized classes of devices within a network, the method comprising:
   performing class discovery of one or more devices within a ring network, where each of the one or more devices within the ring network is characterized by only one inbound path and one outbound path;
   configuring one or more transit resources of the ring network in response to the performed class discovery, where at least a portion of the configured one or more transit resources of the ring network are reserved to route traffic for any of the one or more devices associated with at least a portion of the discovered classes identified by the performed class discovery; and
   routing traffic from the one or more devices according to the configured one or more transit resources of the ring network.

15. The method of claim 14, further comprising prioritizing the at least the portion of the discovered classes.

16. The method of claim 15, wherein the configuring is based at least in part on the prioritizing.

17. The method of claim 15, wherein the prioritization is based on a device type of the one or more devices.

18. The method of claim 14, wherein the class discovery is performed at least in part by the one or more devices registering with a centralized network entity.

\* \* \* \* \*